US010572984B2

(12) United States Patent
Jolly et al.

(10) Patent No.: US 10,572,984 B2
(45) Date of Patent: Feb. 25, 2020

(54) METHOD FOR INVERSE TONE MAPPING OF AN IMAGE WITH VISUAL EFFECTS

(71) Applicant: THOMSON Licensing, Issy-les-Moulineaux (FR)

(72) Inventors: Emmanuel Jolly, Rennes (FR); Jurgen Stauder, Montreuil/Ille (FR); Hassane Guermoud, Cesson Sévigné (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 84 days.

(21) Appl. No.: 15/916,169

(22) Filed: Mar. 8, 2018

(65) Prior Publication Data
US 2018/0260942 A1 Sep. 13, 2018

(30) Foreign Application Priority Data

Mar. 9, 2017 (EP) .................................... 17305256

(51) Int. Cl.
*G06T 15/06* (2011.01)
*G06T 5/00* (2006.01)
(Continued)

(52) U.S. Cl.
CPC .............. *G06T 5/009* (2013.01); *G06T 5/008* (2013.01); *G06T 15/06* (2013.01); *G06T 15/50* (2013.01);
(Continued)

(58) Field of Classification Search
CPC ......... G06T 5/009; G06T 5/008; G06T 15/50; G06T 15/06; G06T 2207/20008;
(Continued)

(56) References Cited

U.S. PATENT DOCUMENTS 7,983,496 B2 * 7/2011 Liu ...................... H04N 19/176
382/232
8,248,486 B1 8/2012 Ward et al.
(Continued)

FOREIGN PATENT DOCUMENTS

WO WO2010132237 11/2010
WO WO2012127401 9/2012
(Continued)

OTHER PUBLICATIONS

Watt, A., "8 Ray Tracing", 3D Computer Graphics, Second Edition, Addison Wesley Publishing Company, Boston, 1993, pp. 267-311.
(Continued)

*Primary Examiner* — Sheela C Chawan
(74) *Attorney, Agent, or Firm* — Brian J. Dorini; Patricia A. Verlangieri

(57) ABSTRACT

A method and apparatus for inverse tone mapping of an LDR image with computer generated imagery components, such components being also called visual effects, are disclosed. The disclosed method includes accessing a first LDR image, the first LDR image being obtained from at least one computer generated imagery component rendered and composited into an LDR reference image or background plate; determining an HDR lighting indication responsive to information extracted from a part of the first LDR image and a respective part of a first intermediate HDR image obtained by applying a first pass inverse tone mapping to the first LDR image; obtaining a second intermediate HDR image by applying a second pass inverse tone mapping to the LDR reference image; obtaining the first HDR image from the computer generated imagery components rendered using HDR lighting indication and composited into the second intermediate HDR image.

19 Claims, 3 Drawing Sheets

(51) Int. Cl.

| | | |
|---|---|---|
| *G06T 15/50* | (2011.01) | |
| *H04N 19/117* | (2014.01) | |
| *H04N 19/154* | (2014.01) | |
| *H04N 19/17* | (2014.01) | |
| *H04N 19/44* | (2014.01) | |
| *H04N 19/25* | (2014.01) | |
| *H04N 19/98* | (2014.01) | |

(52) U.S. Cl.
CPC ......... *H04N 19/117* (2014.11); *H04N 19/154* (2014.11); *H04N 19/17* (2014.11); *H04N 19/25* (2014.11); *H04N 19/44* (2014.11); *H04N 19/98* (2014.11); *G06T 2207/20008* (2013.01); *G06T 2207/20208* (2013.01)

(58) Field of Classification Search
CPC ......... G06T 2207/20208; H04N 19/98; H04N 19/25; H04N 19/44; H04N 19/17; H04N 19/117; H04N 19/154
USPC ....... 382/254, 274, 238, 232, 162, 167, 260, 382/276, 168, 169, 293, 298, 299; 375/240.12, 240.01, 240, 240.11, 240.08; 348/222.1, 229.1, 362, 239, 223.1; 345/589
See application file for complete search history.

(56) References Cited

U.S. PATENT DOCUMENTS

| | | | | |
|---|---|---|---|---|
| 8,289,412 | B2* | 10/2012 | Banterle | G06T 5/008 348/222.1 |
| 8,483,479 | B2* | 7/2013 | Kunkel | G06T 5/009 382/162 |
| 9,020,257 | B2* | 4/2015 | El-Mahdy | G06T 5/009 348/207.1 |
| 2013/0083838 | A1* | 4/2013 | Touze | H04N 5/2355 375/240.01 |

FOREIGN PATENT DOCUMENTS

| | | |
|---|---|---|
| WO | WO2012147018 | 11/2012 |
| WO | WO2014128586 | 8/2014 |
| WO | WO2015096955 | 7/2015 |

OTHER PUBLICATIONS

Watt, A., "4.9 Empirical transparency", 3D Computer Graphics, Second Edition, Addison Wesley Publishing Company, Boston, 1993, pp. 108-109.

Watt, A., "5.5.2 The Z-buffer algorithm", 3D Computer Graphics, Second Edition, Addison Wesley Publishing Company, Boston, 1993, pp. 150-151.

Berg, T., "Compositing & Blending", CSE 590 Computational Photography, State University of New York, Stony Brook, New York, USA, Feb. 28, 2011, pp. 1-157.

* cited by examiner

METHOD FOR INVERSE TONE MAPPING OF AN IMAGE WITH VISUAL EFFECTS

REFERENCE TO RELATED EUROPEAN APPLICATION

This application claims priority from European Patent Application No. 17305256.4, entitled "METHOD FOR INVERSE TONE MAPPING OF AN IMAGE WITH VISUAL EFFECTS", filed on Mar. 9, 2017, the contents of which are hereby incorporated by reference in its entirety.

TECHNICAL FIELD

The invention pertains to the field of high dynamic range imaging and addresses notably the problem of inverse tone mapping of low dynamic range content containing visual effects.

BACKGROUND ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Recent advancements in display technology are beginning that allows an extended range of color, luminance and contrast to be displayed. Technologies allowing for extensions in luminance or brightness range of image content are known as high dynamic range imaging, often shortened to HDR. HDR images have at least one of the higher white level, higher contrast or higher bit depth than conventional (hereon referred to as LDR for low dynamic range) images. Today, a huge amount of legacy LDR content is available that need to be extended to HDR images, for example HDTV broadcast content or feature films color graded for classical cinema projection.

To prepare LDR content for HDR display devices, reverse or inverse tone mapping operators (iTMO) are employed. Such algorithms process the luminance level, contrast, hue and chroma in the image content with the aim of recovering or recreating the appearance of the original scene. Typically, iTMOs take a conventional (i.e. LDR) image as input, expand the luminance range of the colors of this image in a global manner, and subsequently process dark or bright regions locally to enhance the HDR appearance of colors in the image. Usually generated HDR images can be trusted, however, noise, clipping and quantization present in LDR images might be amplified when recreating HDR image. This is particularly problematic for images containing visual effects.

In today filmmaking but also gaming, visual effects (hereon referred to as VFX) cover the processes by which computer generated imagery is created and/or manipulated apart from the workflow of capturing images during a live action footage (hereon referred to as natural images). VFX, in non-limiting examples, comprise artificially created visual elements such as animated objects and characters, light effects, transparent objects such as fire, smoke and fog that are added to natural images in order to generate a final intended image (hereon referred to as image containing VFX). Some VFX are linked to light effects, for example specular reflections and cast shadows, and particularly induce dark or bright parts in the images. VFX are often created from physical models of light emission, reflection, transmission and absorption in a scene. These physical light models are part of so-called VFX assets. VFX assets contain all light, shape, texture and motion related information required for VFX generation. The physical light models use high numerical precision. From these models, images are rendered. This is the step where the high precision effects are baked into images of usually limited precision, for example due to quantization into 10 or 12 bits per color channel and pixel. According to another example related to gaming, images and synthetic objects are transmitted to a consumer device using MPEG-4 Binary Format for Scene (BIFS) in an audiovisual stream according to MPEG-4 Part 11. Then, the consumer device renders the synthetic objects and inserts them into the images. Again these kind of artificial images shows highlights, saturated colors and other light effects of high precision up to the quantization of the image signal. Since parts of LDR images related to VFX reveal significant highlights, dark shadows, saturated colors and generally light effects of high visual quality, the poor quality of VFX in HDR images that were generated by inverse tone mapping methods from LDR images containing VFX is particularly troublesome. Notably can be expected that parts of such HDR images suffer from clipping, luminance compression, lack of details, modification of saturation, noise amplification and banding.

Although several iTMO solutions exist such as different iTMO depending on parts of the image or iterative ITMO process, none of those methods particularly address the specificity of the images generated with VFX.

SUMMARY OF INVENTION

In view of the foregoing, there is a need for a novel iTMO which aims at enhancing the visual quality of HDR images with VFX. A salient idea of the present principles is to generate an HDR image from an LDR image using a first pass of inverse tone mapping and to use information from the HDR image obtained by the first iTMO pass, to regenerate VFX for use in an HDR image without VFX.

According to a first aspect of the present disclosure, a method for inverse tone mapping of a low dynamic range image with at least one computer generated imagery component (or at least one visual effect, or at least one synthetic component), called first LDR image (LDR w VFX), into a high dynamic range image with the at least one computer generated imagery component (or visual effect), called first HDR (HDR w VFX) image is disclosed. The method comprises accessing the first LDR image, wherein the first LDR image is obtained by the at least one computer generated imagery component (VFX asset) rendered and composited into an LDR reference image (LDR w/o VFX); determining an HDR lighting indication responsive to information extracted from a part of said first LDR image and a respective part of a first intermediate HDR image, the respective part of the first intermediate High Dynamic Range HDR image being obtained by applying an inverse tone mapping to the first LDR image or, in a variant, to a subpart of the first LDR image; obtaining a second intermediate HDR image by applying said inverse tone mapping to said LDR reference image; obtaining the first HDR image from the at least one computer generated imagery component (VFX asset) rendered using the HDR lighting indication and composited into the second intermediate HDR image. Thus, the clipping, luminance compression, lack of details, modification of saturation, noise amplification and banding in part of the LDR images related to VFX is avoided because VFX are generated within HDR images having at least one of the higher white level, higher contrast or higher bit depth. Advantageously, the image quality in parts in the HDR images that are related to VFX is greatly enhanced since information is fully retrieved from VFX assets for those parts. The reference LDR image therefore corresponds to natural images into which visual effects are inserted, wherein visual effects are computer-generated imagery components created apart from the workflow of capturing reference images. Thus, the HDR lighting information, used to obtain the first high dynamic range (HDR w VFX) image, is generated from the samples of the tone-mapped first low dynamic range (LDR w VFX) image and the correspondent samples of the first intermediate HDR image computed by applying inverse tone-mapping to the reference image (in other word to the natural image used for compositing).

According to a particular embodiment, the method further comprises selecting a subset of the at least one computer generated imagery component related to at least one transparent object; and wherein the selected subset of at least one computer generated imagery component is included into the LDR reference image and the computer generated imagery components not in the selected subset are rendered using HDR lighting indication. Therefore only parts of the visual effects or computer generated imagery components raising issue in inverse tone mapping are processed with the 2 pass iTMO method. In this variant, the reference LDR image therefore corresponds to natural image further processed to include some of the computer generated imagery components.

According to another particular embodiment, determining the HDR lighting indication further comprises determining a factor from a difference between a part of the first LDR image and a respective part of the first intermediate HDR image, the factor being applied to amplitudes of light sources of the at least one computer generated imagery component (VFX asset).

According to another particular embodiment, determining the HDR lighting indication further comprises determining a luminance dependent factor from a difference between a part of the first LDR image and a respective part of the first intermediate HDR image, the luminance dependent factor being applied to amplitudes of light sources of the at least one computer generated imagery component (VFX asset) with respect to a luminance of the at least one computer generated imagery component rendered into an LDR image.

According to another particular embodiment, the HDR lighting indication is further responsive to the at least one computer generated imagery component. Advantageously, the method is iteratively applied so has to minimize the difference of the final HDR w VFX image, comparing it to the $1^{st}$ intermediate HDR image by varying the HDR lighting indication.

According to another particular embodiment, the LDR reference image is encoded using MPEG-4 video coding standard and at least one of scene objet or a light source is encoded using MPEG-4 Binary Format for Scene (BIFS). Advantageously, this embodiment advantageously allows automatic iTMO processing of LDR images, thus it is possible to integrate into consumer devices or to lower cost in content production.

According to a second aspect of the present disclosure, a device for inverse tone mapping of a low dynamic range image with at least one computer generated imagery component, called first LDR (LDR w VFX) image, into a high dynamic range image with the at least one computer generated imagery component, called first HDR (HDR w VFX) image is disclosed. The device comprises means for accessing the first LDR image, the first LDR image being obtained from at least one computer generated imagery component (VFX asset) rendered and composited into an LDR reference image (LDR w/o VFX); means for determining an HDR lighting indication responsive to information extracted from a part of the first LDR image and a respective part of a first intermediate HDR image, the respective part of first intermediate High Dynamic Range HDR image being obtained by applying an inverse tone mapping to the first LDR image; means for obtaining a second intermediate HDR image by applying the inverse tone mapping to the LDR reference image; means for obtaining the first HDR image from the computer generated imagery components (VFX asset) rendered using the HDR lighting indication and composited into the second intermediate HDR image.

According to a specific embodiment, the device comprises a processor implementing the disclosed method in any of its embodiments.

According to a specific embodiment, the device belongs to a set comprising:
a mobile device;
a communication device;
a game device;
a set top box;
a TV set;
a Blu-Ray disc player;
a player;
a tablet (or tablet computer);
a laptop;
a display;
a camera and
a decoding chip.

According to a third aspect of the present disclosure, there is provided computer program comprising program code instructions executable by a processor for implementing the steps of the method according to the first aspect of the disclosure.

According to a fourth aspect of the present disclosure, there is provided computer program product which is stored on a non-transitory computer readable medium and comprises program code instructions executable by a processor for implementing the steps of a method according to the first aspect of the disclosure.

According to a fifth aspect, a processor readable medium is disclosed that has stored therein instructions for causing a processor to perform at least the steps of any of the disclosed methods.

According to a sixth aspect, a non-transitory program storage device is disclosed that is readable by a computer, tangibly embodies a program of instructions executable by the computer to perform any of the disclosed methods.

While not explicitly described, the present embodiments may be employed in any combination or sub-combination. For example, the invention is not limited to the described color transform and any adjustable parametric function can be used for interpolation purpose.

Besides, any characteristic or embodiment described for the methods is compatible with a device intended to process the disclosed method and with a computer-readable storage medium storing program instructions.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

In the discussion that follows, specific details of particular embodiments of the present techniques are set forth for purposes of explanation and not for purposes of limitation. It will be appreciated by those skilled in the art that other embodiments may be employed apart from these specific details. Furthermore, in some instances detailed descriptions of well-known methods, interfaces, circuits, and devices are omitted so as not obscure the description with unnecessary detail.

Those skilled in the art will appreciate that some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers.

Figure 1:
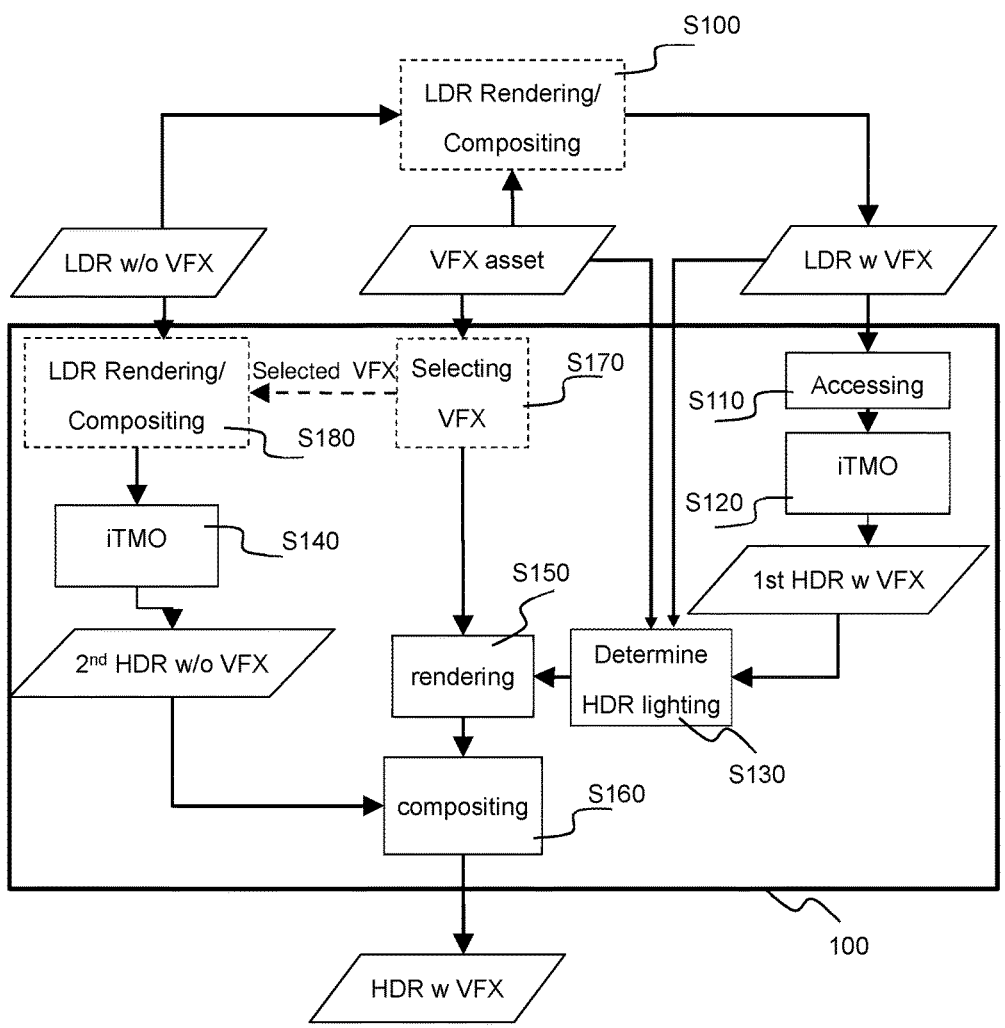
FIG. 1 is a flow chart illustrating the method for inverse tone mapping of an LDR image with VFX according to a first embodiment of the present disclosure.

Now, reference will be made to FIG. 1 for illustrating a method 100 for inverse tone mapping of an LDR image with VFX according to a first embodiment of the present disclosure. According to the first embodiment, LDR image with VFX, referred as LDR w VFX, was created by compositing, in a preliminary step S100, a given LDR image without VFX, referred as LDR w/o VFX or LDR reference image or LDR background plate, and an LDR image rendered using the given VFX assets. That is the rendering produces an LDR artificial image from a VFX asset. The LDR artificial image and LDR reference image are then merged by the compositing. The LDR rendering/compositing step S100 is out of the scope of the method in the first embodiment. Only an LDR VFX image is needed in this first embodiment. However, the skilled in the art understand that depending on the input information of the method, the LDR rendering/compositing step S100 can be part of the method are described hereafter with reference to the second embodiment. According to non-limiting examples, a VFX asset contains the shape, texture, surface reflection and motion or position of 2D or 3D objects such as synthetic characters, synthetic cars, synthetic fire or synthetic monsters, etc. . . . . According to other non-limiting examples, a VFX asset contains intensity, color, size and motion or position of light sources such as street lights, light from a fire or moonlight. We use well-known rendering techniques based on 3D projection and ray tracing as disclosed in the book of Alan Watt entitled "3D Computer Graphics" (pages 267-311) published by Addison-Wesley. First, ray tracing determines the amount of light coming from all surfaces of all 3D objects, and then these objects are projected into the 2D plane in order to form an image. In this preliminary step S100, the rendered image is an LDR image, accordingly the white level, the contrast or bit depth of the rendered image is adapted to Low Dynamic Range color coordinates using LDR lighting indication. The LDR lighting indication controls light effects of the VFX asset such as specular reflections and cast shadows intended for an LDR image. Then the compositing integrates the image produced by rendering into an already existing image. Compositing uses known methods, among them Z-buffering methods and transparency methods such as described in the book of Alan Watt (pages 150-151) or blending methods such as described by Tamara Berg in her lecture on Computational Photography and Compositing and Blending. This preliminary LDR rendering and compositing step S100 thus outputs an LDR with VFX image.

Then in a first step S110, the LDR with VFX image is accessed. As exposed above, the LDR with VFX image is obtained by compositing at least one visual effect rendered using Low Dynamic Range LDR lighting indication into an LDR reference image. For instance, LDR with VFX image is retrieved from the memory of the device 3.

In a second step S120, a first intermediate High Dynamic Range HDR, $1^{st}$ HDR w VFX, image is obtained by applying an inverse tone mapping operator to the LDR w VFX image. The inverse tone mapping operator, referred as iTMO, is able to transform an LDR image having at least one of low white level, low contrast and small bit depth, into an HDR image having at least one of high white level, high contrast and high bit depth. Any inverse tone mapping technique is compatible with the present principles. According to a non-limiting example, the technique described in EP3087730 A1 from the same applicant is used. This technique discloses expanding the dynamic range of low dynamic range content to prepare such content for display devices having notably high peak luminance. This is done by selectively and dynamically remapping the colors of an LDR image by changing the luminance of these colors and notably the contrast range of this luminance. According to EP3087730 A1 a pixel luminance-enhancement value $Y_{enhance}(P)$ is obtained for each pixel (p) of the image, by extracting high frequencies of luminance values of colors of pixels in the spatial neighborhood of the pixel, inverse tone mapping the luminance Y(p) of each pixel (p) of the image into an expanded luminance $Y_{exp}(p)$ obtained through the product of the luminance Y(p) of the pixel at the power of the pixel expansion exponent value E'(p) obtained for this pixel and of the pixel luminance-enhancement value obtained for the pixel at the power of an exponent parameter c, which is superior or equal to 1.

It means that $Y_{exp}(p)=Y(p)^{E'(p)} \times [Y_{enhance}(p)]^c$

The exponent parameter c controls the amount of detail enhancement brought by pixel luminance-enhancement value. Therefore, larger values of c gradually increase the contrast of image edges. A value of c=1.5 is preferably used. This first pass iTMO step S120 thus outputs a $1^{st}$ HDR with VFX image that the present principles focusses on enhancing.

In a third step S130, an HDR lighting indication is determined from information extracted responsive to a part of the LDR with VFX image and a respective part of the first intermediate HDR image with VFX. Advantageously, the HDR lighting indication is such that the HDR image produced by the rendering S150 of the VFX controlled by the HDR lighting indication fit in well into a second HDR intermediate image without VFX generated in a second iTMO step S140. As exposed for the LDR lighting indication, the HDR lighting indication, in non-limiting examples, controls light effects of the VFX asset such as specular reflections and cast shadows intended for an HDR image. Then the compositing step S160 will deliver a naturally looking final HDR image. The skilled in the art will appreciate that this rendering of VFX for HDR avoids luminance compression, lack of detail, modification of saturation and notably clipping and noise amplification due to representation into LDR color coordinates of strong light effects such as highlights and cast shadow by an iTMO algorithm as explained hereafter. In fact, iTMO is not involved directly in producing image colors corresponding to VFX.

The determination of HDR lighting indication exploits a series of input information. A first input information is the result of a comparison between the LDR with VFX image and the first intermediate HDR image, $1^{st}$ HDR with VFX, referred to as $1^{st}$ HDR w VFX. Indeed, all VFX contained in the LDR image will be modified in their color, notably in their luminance. Thus the comparison observing this modification is advantageously limited to pixels belonging to part of the image (being LDR or $1^{st}$ HDR) containing VFX. To that end, a second input information is the VFX asset. The observed color modification of VFX is linked with the shape, texture, reflection and motion of the VFX asset as well with the intensity, color, size and motion of the parts of LDR w VFX image and $1^{st}$ HDR w VFX image related to VFX. By this way, an HDR lighting indication is computed such that the shape, texture, reflection and motion of the VFX asset rendered into an image are closed to the modified colors of the VFX observed in the first intermediate HDR image. In other words, the difference between the shape, texture, reflection and motion of the VFX asset rendered into an image and the modified colors of the VFX observed in the first intermediate HDR image is minimal. Using the HDR lighting, the VFX in the first HDR image can be regenerated by rendering in best quality while the VFX present in the first intermediate HDR image suffer from known limitations of iTMO such as clipping and banding. The mentioned minimal difference can be understood in different manners. A first signal-based manner is to aim a minimal difference between all rendered colors and the colors in $1^{st}$ HDR w VFX. A second physical-based manner is to aim realism and thus to aim alignment of physical elements such as rendered black levels, rendered white levels or rendered color gamut to the $1^{st}$ HDR w VFX.

A first variant is now described which is adapted to VFX assets being composed of a single, non-transparent, textured, lambertian VFX object and light sources. Besides, in this first variant, the light effects on the object surface (shading) or in the scene (cast shadows) are supposed to be characterized by diffuse reflection of the light on object surfaces. In this first variant, the HDR effect is thus characterized by a global increase of the reflected light and of the amplitudes of visible light sources. According to the present principles, the HDR lighting is estimated by the application of a factor to the amplitudes of the LDR light sources of the VFX assets. The factor is determined by comparing selected parts of the first intermediate HDR image and the LDR with VFX image. In order to avoid unwanted influence of iTMO effects such as luminance compression or saturation modification, the selected parts contain physical characteristic effects such as strong diffuse reflection on bright or white object surfaces. In order to avoid unwanted influence of iTMO effect such as clipping, the selected parts do not contain visible light sources. In order to avoid unwanted influence of iTMO effect such as noise amplification or banding, the selected parts contain each several neighbored pixels of the first intermediate HDR image and the LDR with VFX image. The factor for light sources is then obtained by calculating the average over the selected parts of the ratio of luminance of related pixels of the first intermediate HDR image and the LDR with VFX image. In a variant, the factor is a linear multiplicative ratio to apply to amplitude of light sources of VFX assets.

In another variant, the factor can be optionally be refined responsive to the VFX asset by iteratively calculating the final HDR w VFX image, comparing it to the $1^{st}$ intermediate HDR image, and iteratively minimizing the difference of these two images by varying the factor.

This embodiment is particularly well adapted to LDR w VFX images that contain visible light sources that might be clipped by traditional iTMO.

In particular, this embodiment might allow better range expansion of cast shadows since visible light sources can be exploited. Indeed cast shadows occur if a first object hinders the light of a light source to reach a second object. Cast shadows on this second object are often much darker than the surrounding scene and lead to image regions with very small LDR color coordinates. LDR color coordinates may even be clipped to zero or be dynamically strongly compressed to values close to zero. As the factor is applied to the LDR light sources amplitudes, and not to the closed to zero values of the LDR w VFX image, the precision of the VFX asset is advantageously exploited in order to create high precision HDR w VFX images.

A second variant is also described which is particularly adapted for so-called non-transparent VFX objects being characterized by diffuse and specular reflection. This means that the VFX in the images contain highlights. The HDR effect will be represented by some non-linear light increase. In fact, highlights contain usually colors of a large dynamic range including very bright colors in the center of the highlight and relatively darker pixels at the border of a highlight. Such a large dynamic range will be modified in a non-linear manner by iTMO since iTMO is usually non-linear. In order to estimate the HDR lighting indication from the LDR w VFX image, the highlights are considered. The LDR w VFX image and the first intermediate HDR image are compared within selected parts of VFX where there are highlights in order to determine a luminance-dependent factor $F(L)$ to be applied to the amplitudes of the LDR light sources. The luminance-dependent factor for light sources is represented as a curve $F(L)$ depending on luminance that is obtained by fitting a curve to $\{L, R\}$ luminance-ratio tuples such that $\{L, F(L)\}$ is closed to $\{L, R\}$. In these tuples, a luminance value L is the luminance of the pixels of the selected parts of the LDR w VFX image and a ratio R is the inverse ratio of this luminance L of a pixel and the luminance of the related pixel of the first intermediate HDR image. The luminance-dependent factor $F(L)$ is then applied to the amplitudes of the VFX asset in the following way. For each light source S, a luminance value $L_S$ is determined that would be rendered in an LDR image on a white, lambertian reference surface. Then, a factor $F(L_S)$ is applied to the amplitude of this light source.

In particular, this embodiment further allows better range expansion of specular reflections. Specular reflections as opposed to diffuse reflections occur at glossy surfaces of objects where large amounts of light are reflected. This effect leads to so-called highlights in images. Specular reflections often lead within the highlight regions to luminance compression, loss of details and even clipping of color coordinates at their maximum legal level because of the large amount of incoming light. For example, if the range of color coordinates is from 0 to 1023, color coordinates in regions of specular reflections may be clipped and are often clipped to 1023 or at least strongly dynamically compressed into values close to 1023. Again, as the luminance-dependent factor is applied to the VFX asset, and not to the clipped or compressed values of the LDR w VFX image, the precision and quality of the VFX asset is advantageously exploited in order to create high precision HDR w VFX images.

To handle such variants, an optional step S170 selects a subset of the at least one visual effect related to transparent objects. The visual effects related to transparent objects are included into the LDR reference image; and only the non selected subset of visual effects (ie the visual effects not in the selection if any) is rendered in the step S150 using HDR lighting indication. Advantageously, the selecting step S170 further allows implementing the present principles for different types of VFX asset, all VFX not raising quality issue in inverse tone mapping. The LDR reference image is generated by the compositing and rendering step S180 and then used according to the present principles. In other words, the selecting step S170 allows implementing a targeted determination of the HDR lighting indication from images, i.e. the determination targets HDR lighting indication for diffuse reflection or HDR lighting indication for specular reflection as respectively described in first and second variants. In more general way, the selecting step S170 allows implementing a simplified determination of the HDR lighting indication from images, such simplified determination being well adapted when VFX asset include partially transparent objects such as fog, glass and smoke. Once rendered into an image, these objects and the related light effects are characterized by transparency, by highly non-linear behavior, by spatially invariant nature and does not always exhibit clipping or compression properties in LDR color coordinates or those properties may be acceptable in an artistic workflow. In order to allow a simplified implementation of the determining of HDR lighting indication, the selection of VFX subset will exclude for instance such partially transparent objects from the selected VFX asset.

In a fourth step S140, a second intermediate HDR image, $2^{nd}$ HDR w/o VFX, is obtained by applying the inverse tone mapping to the LDR reference image. According to different variants, the same inverse tone mapping technique as in iTMO step S120 or a different one is used. This step provides the HDR image, $2^{nd}$ HDR w/o VFX, for a second compositing step S160 producing an enhanced HDR image with VFX, wherein the VFX are rendered with HDR lighting indication. The skilled in the art will understand that, according to the variant of the selection of VFX asset, LDR reference image will include no VFX at all or a limited subset of VFX excluded from the selection S170.

In a final fifth step S160, the enhanced HDR w VFX image is obtained by compositing the visual effects rendered using HDR lighting indication into the second intermediate HDR image. Since the VFX are directly rendered in HDR color coordinates, the disclosed method thus prevents the clipping, compression and noise amplification in LDR color coordinates of some VFX to induce artefact in HDR expended image.

Figure 2:
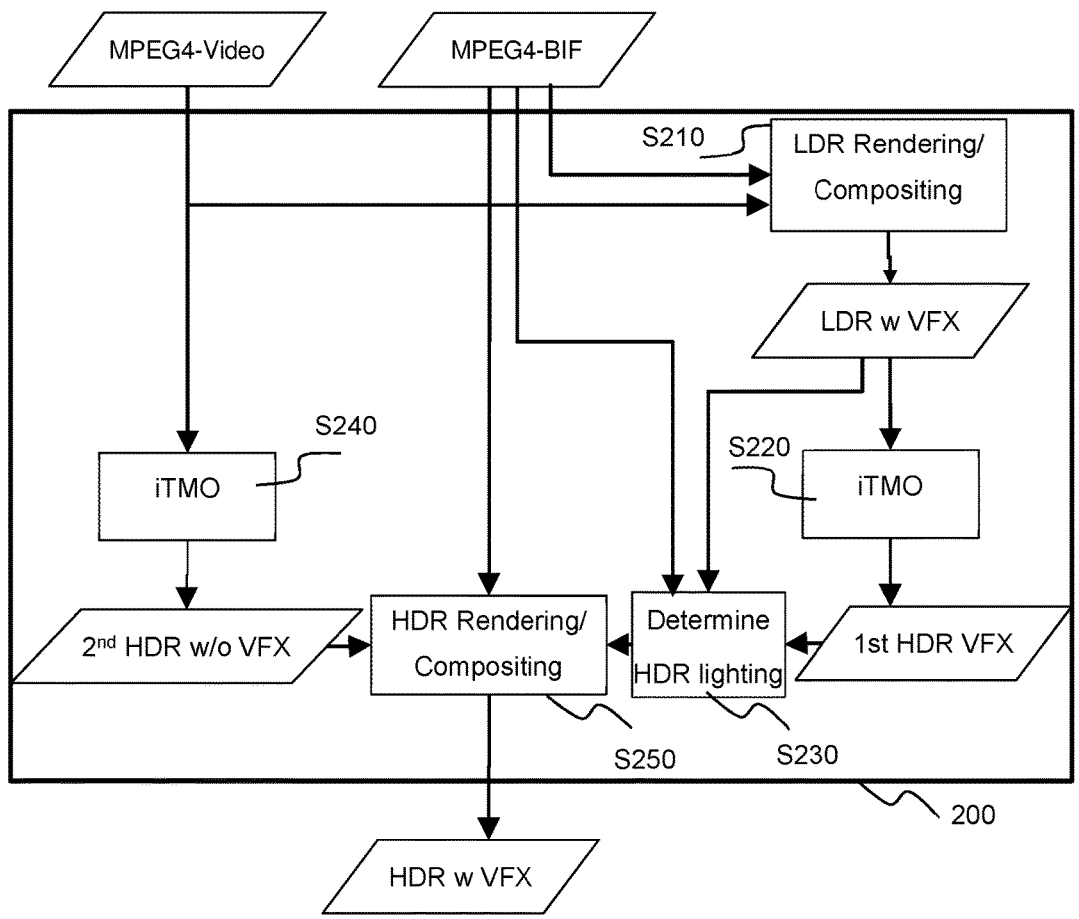
FIG. 2 is a flow chart illustrating the method for inverse tone mapping of an LDR image with VFX according to a second embodiment of the present disclosure.

FIG. 2 illustrates a method 200 for inverse tone mapping of an LDR image with VFX according to a second embodiment of the present disclosure. The second embodiment is almost similar in the processing to the first embodiment and preferably differences are exposed hereafter. The variant features in any of their combination described for method 100 according to the first embodiment are compatible with the method 200 according to the second embodiment. In the second embodiment, the input LDR reference image is encoded using MPEG 4 Video coding standard and at least one of a scene object or a light source—the VFX asset—are encoded using MPEG-4 Binary Format for Scene (BIFS). The second embodiment is well adapted to be implemented within a consumer device such as a game device or virtual reality head mounted display. According to the second embodiment, in the step S210, the LDR w VFX image is generated from a MPEG-4 LDR video stream. Advantageously, the second embodiment allows to generate an HDR stream with increased image quality in the parts of the image related to the scene objects. Thus in the first step S210, accessing an LDR w VFX image comprising compositing the LDR reference image (decoded from the MPEG4 stream, video component of the stream) with an LDR image obtained by rendering of the VFX (also decoded from the MPEG4 stream, BIFS component of the stream).

In a second step S220, a first intermediate High Dynamic Range HDR, $1^{st}$ HDR w VFX, image is obtained by applying an inverse tone mapping operator to the LDR w VFX image.

In a third step S230, an HDR lighting indication is determined from the VFX asset (i.e. the scene and light source) and information extracted responsive to a part of the LDR w VFX image and a respective part of the first intermediate HDR image as exposed with any variants of the method of the first embodiment.

In a fourth step S240, a second intermediate HDR image, $2^{nd}$ HDR w/o VFX, is obtained by applying the inverse tone mapping to the LDR reference image.

In a final fifth step S250, the enhanced HDR w VFX image is obtained by compositing the visual effects rendered using HDR lighting indication into the second intermediate HDR image.

Figure 3:
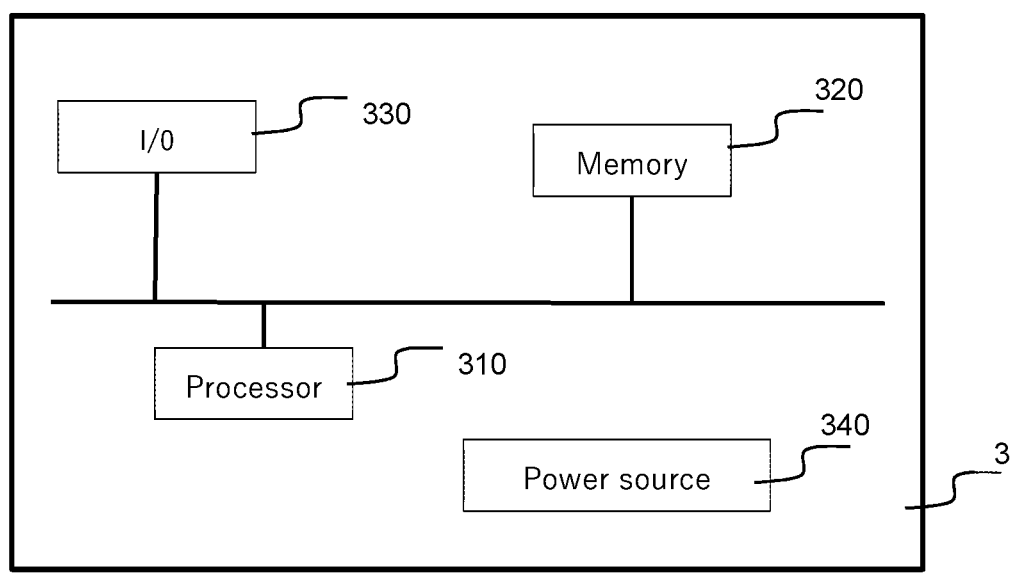
FIG. 3 is a schematic diagram illustrating a structure of an apparatus for inverse tone mapping of an LDR image with VFX according to the present disclosure.

FIG. 3 represents an exemplary architecture of device 3 for inverse tone mapping a low dynamic range image with visual effects according to an exemplary and non-limiting embodiment. The inverse tone mapping device 3 is configured to execute any of the methods described with reference to FIG. 1 or 2. The inverse tone mapping device 3 comprises one or more processor(s) 310, which could comprise, for example, a CPU, a GPU and/or a DSP (Digital Signal Processor), along with internal memory 320 (e.g. RAM, ROM and/or EPROM). The inverse tone mapping device 3 comprises one or more Input/Output interface(s) 330, each adapted to obtain input information, display output information and/or to allow a user to enter commands and/or data (e.g. a keyboard, a mouse, a touchpad, a webcam); and a power source 340 which may be external to the inverse tone mapping device 3. The inverse tone mapping device may also comprise one or more network interface(s) (not shown). The inverse tone mapping device may further comprise one or more dedicated hardware modules for rendering, and composting or one or more iTMO for sequential or parallel processing of the different steps (not shown). According to the first embodiment, the LDR w VFX image, the VFX asset and the LDR reference image may be obtained from a source and stored in the memory 320. According to the second embodiment, a video stream may be obtained from a source and stored in the memory 320, the video stream being compliant with MPEG-4 Part 11 encoding video and scene objects for instance using MPEG-4 Binary Format for Scene (BIFS). LDR w VFX image is then locally generated and stored in the memory 320.

According to different embodiments, the HDR w VFX image may be sent to a destination, e.g. an HDR display device. As an example, the HDR w VFX image version of the image is stored in a remote or in a local memory 320, e.g. a video memory or a RAM, a hard disk. In a variant, the HDR w VFX image is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the inverse tone mapping device 3 further comprises a computer program stored in the memory 320. The computer program comprises instructions which, when executed by the inverse tone mapping device 3, in particular by the processor 310, enable the inverse tone mapping device 3 to execute the method described with reference to FIG. 1 (or FIG. 2). According to a variant, the computer program is stored externally to the inverse tone mapping device 3 on a non-transitory digital data support, e.g. on an external storage medium such as a HDD, CD-ROM, DVD, a read-only and/or DVD drive and/or a DVD Read/Write drive, all known in the art. The inverse tone mapping device 3 thus comprises a mechanism to read the computer program. Further, the inverse tone mapping device 3 could access one or more Universal Serial Bus (USB)-type storage devices (e.g., "memory sticks.") through corresponding USB ports (not shown).

According to exemplary and non-limiting embodiments, the inverse tone mapping device 3 can be, but not limited to:
a mobile device;
a communication device;
a game device;
a set top box;
a TV set;
a tablet (or tablet computer);
a laptop;
a video player, i.e. a Blu-Ray disc player;
a display;
a camera; and
a decoding chip.

The invention claimed is:

1. A method for inverse tone mapping of a low dynamic range image with at least one computer generated imagery component, called first LDR image, into a high dynamic range image with said at least one computer generated image component, called first HDR image, said method comprising:
  accessing said first LDR image, said first LDR image being obtained by at least one computer generated imagery component rendered and composited into an LDR reference image;
  determining an HDR lighting indication responsive to information extracted from a part of said first LDR image and a respective part of a first intermediate High Dynamic Range HDR image obtained by applying an inverse tone mapping to said first LDR image;
  obtaining a second intermediate HDR image by applying said inverse tone mapping to said LDR reference image;
  obtaining said first HDR image from said at least one computer generated imagery component rendered using said HDR lighting indication and composited into said second intermediate HDR image.

2. The method of claim 1, wherein the method further comprises selecting a subset of said at least one computer generated imagery component related to at least one transparent object;
  wherein said selected subset of at least one computer generated imagery component is included into said LDR reference image; and
  wherein the computer-generated imagery components not in the selected subset are rendered using HDR lighting indication and composited into said second intermediate HDR image.

3. The method of claim 1, wherein determining said HDR lighting indication further comprises determining a factor from a difference between a part of said first LDR image and a respective part of said first intermediate HDR image, said factor being applied to amplitudes of light sources of said at least one computer generated imagery component.

4. The method of claim 3, wherein said HDR lighting indication is further responsive to said at least one computer generated imagery component.

5. The method of claim 1, wherein determining said HDR lighting indication further comprises determining a luminance dependent factor from a difference between a part of said first LDR image and a respective part of said first intermediate HDR image, said luminance dependent factor being applied to amplitudes of light sources of said at least one computer generated imagery component with respect to a luminance of said at least one computer generated imagery component rendered into an LDR image.

6. The method of claim 1, wherein said LDR reference image is encoded using MPEG-4 video coding standard and at least one of scene object or a light source is encoded using MPEG-4 Binary Format for Scene.

7. A device for inverse tone mapping of a low dynamic range image with at least one computer generated imagery component, called first LDR image, into a high dynamic range image with said at least one computer generated imagery component, called first HDR image, said device comprising a processor configured to:
  access said first LDR image, said first LDR image being obtained by at least one computer generated imagery component rendered and corn posited into an LDR reference image;
  determine an HDR lighting indication responsive to information extracted from a part of said first LDR image and a respective part of a first intermediate High Dynamic Range HDR image obtained by applying an inverse tone mapping to said first LDR image;
  obtain a second intermediate HDR image by applying said inverse tone mapping to said LDR reference image;
  obtain said first HDR image from said computer generated imagery components rendered using said HDR lighting indication and composited into said second intermediate HDR image.

8. The device of claim 7, wherein the processor is further configured to select a subset of said at least one computer generated imagery component related to at least one transparent object;
  wherein said selected subset of at least one computer generated imagery component is included into said LDR reference image; and
  wherein the computer generated imagery components not in the selected subset are rendered using said HDR lighting indication and composited into said second intermediate HDR image.

9. The device of claim 7, wherein said HDR lighting indication is responsive to a factor determined from a difference between a part of said first LDR image and a respective part of said first intermediate HDR image, said factor being applied to amplitudes of light sources of said at least one computer generated imagery component.

10. The device of claim 9, wherein said HDR lighting indication is further responsive to said at least one computer generated imagery component.

11. The device of claim 7, wherein said HDR lighting indication is responsive to a luminance dependent factor determined from a difference between a part of said first LDR image and a respective part of said first intermediate HDR image, said luminance dependent factor being applied to amplitudes of light sources of said at least one computer generated imagery component with respect to a luminance of said at least one computer generated imagery component rendered into an LDR image.

12. The device of claim 7, wherein said LDR reference image is encoded using MPEG-4 video coding standard and at least one of scene object or a light source is encoded using MPEG-4 Binary Format for Scene.

13. The device of claim 7 that belongs to a set comprising:
a mobile device;
a communication device;
a game device;
a set top box;
a TV set;
a Blu-Ray disc player;
a player;
a tablet (or tablet computer);
a laptop;
a display;
a camera; and
a decoding chip.

14. A non-transitory program storage device, readable by a computer, tangibly embodies a program of instructions executable by the computer to perform a method for inverse tone mapping of a low dynamic range image with at least one computer generated imagery component, called first LDR image, into a high dynamic range image with said at least one computer generated image component, called first HDR image, said method comprising:
accessing said first LDR image, said first LDR image being obtained by at least one computer generated imagery component rendered and composited into an LDR reference image;
determining an HDR lighting indication responsive to information extracted from a part of said first LDR image and a respective part of a first intermediate High Dynamic Range HDR image obtained by applying an inverse tone mapping to said first LDR image;
obtaining a second intermediate HDR image by applying said inverse tone mapping to said LDR reference image;
obtaining said first HDR image from said at least one computer generated imagery component rendered using said HDR lighting indication and composited into said second intermediate HDR image.

15. The non-transitory program storage device of claim 14, wherein the method further comprises selecting a subset of said at least one computer generated imagery component related to at least one transparent object;
wherein said selected subset of at least one computer generated imagery component is included into said LDR reference image; and
wherein the computer-generated imagery components not in the selected subset are rendered using HDR lighting indication and composited into said second intermediate HDR image.

16. The non-transitory program storage device of claim 14, wherein determining said HDR lighting indication further comprises determining a factor from a difference between a part of said first LDR image and a respective part of said first intermediate HDR image, said factor being applied to amplitudes of light sources of said at least one computer generated imagery component.

17. The non-transitory program storage device of claim 14, wherein determining said HDR lighting indication further comprises determining a luminance dependent factor from a difference between a part of said first LDR image and a respective part of said first intermediate HDR image, said luminance dependent factor being applied to amplitudes of light sources of said at least one computer generated imagery component with respect to a luminance of said at least one computer generated imagery component rendered into an LDR image.

18. The non-transitory program storage device of claim 16, wherein said HDR lighting indication is further responsive to said at least one computer generated imagery component.

19. The non-transitory program storage device of claim 14, wherein said LDR reference image is encoded using MPEG-4 video coding standard and at least one of scene object or a light source is encoded using MPEG-4 Binary Format for Scene.

* * * * *